Patented Oct. 9, 1945

2,386,207

UNITED STATES PATENT OFFICE 2,386,207

METHOD OF MAKING A DITHIOPHOSPHORIC ACID OF AN ALKYL-SUBSTITUTED PHENOL AND A MINERAL OIL CONTAINING THIS COMPOUND

Orland M. Reiff and Harry J. Andress, Jr., Woodbury, N. J., assignors to Socony-Vacuum Oil Company, Incorporated, a corporation of New York No Drawing. Application May 29, 1943, Serial No. 489,086

12 Claims. (Cl. 252—48)

This invention has to do with a method of making dithiophosphoric acids of alkyl-substituted hydroxyaromatic compounds, and particularly has to do with a method of making the dithiophosphoric acids of wax-substituted hydroxyaromatic compounds.

In the prior art, such as that disclosed in a copending application, Serial No. 390,586, filed April 26, 1941, in which one of the present inventors, O. M. Reiff, is a co-inventor, the prevailing method for the preparation of dithiophosphoric acids of alkyl-substituted hydroxyaromatic compounds is shown to be one involving a reaction of an alkyl-substituted hydroxyaromatic compound with $P_2S_5$ under suitable reaction conditions. In the method under discussion, an alkyl-substituted hydroxyaromatic compound is formed in a Friedel-Crafts reaction of an alkyl halide and a hydroxyaromatic compound and isolated from the Friedel-Crafts catalyst used therein, and is then reacted with $P_2S_5$ to form a dithiophosphoric acid of the alkyl-substituted hydroxyaromatic compound. While the yields of dithiophosphoric acids of this type are relatively good with this method, the acids are comparatively impure and tend to decompose, with the evolution of $H_2S$, when heated. They are rather undesirable for certain uses because of their odor and dark color.

The present invention is predicated upon the discovery of a new method for making improved dithiophosphoric acids of the aforesaid type in greater yields. The acids obtained in the new method are superior to those obtained as described hereinabove in that they are lighter in color, are less odorous, are more stable to heat, etc. Not only are the acids so improved, but the metal salts of said acids are characterized as well by a similar improvement over the corresponding metal salts of the acids obtained by the method already described. Accordingly, the present method is contemplated as a superior means for preparing metal salts, and other derivatives, of dithiophosphoric acids of alkyl-substituted hydroxyaromatic compounds as well as for preparing said acids.

The method contemplated herein involves reacting an alkyl halide with a hydroxyaromatic compound in the presence of a Friedel-Crafts catalyst, then reacting the Friedel-Crafts reaction mixture with $P_2S_5$, and finally removing the Friedel-Crafts catalyst and isolating the desired dithiophosphoric acid.

While the preceding statement is a concise description of the new method, the method will be more fully understood from the following detailed discussion. Initially, an alkyl halide and a hydroxyaromatic compound are reacted in the presence of a small or catalytic amount of a Friedel-Crafts catalyst, such for example as $AlCl_3$. A particularly desirable manner for effecting this reaction is that of first admixing the halide and hydroxyaromatic compound, then adding $AlCl_3$ at a rate slow enough to avoid excessive foaming caused by the evolution of hydrogen chloride. After the complete addition of $AlCl_3$, the reaction temperature is raised to complete the reaction. The reaction product at this stage is the aluminum aryl oxide of the alkyl-substituted hydroxyaromatic compound.

Then, $P_2S_5$ is added to the reaction product and the resulting mixture heated at a temperature of about 175° C. until hydrogen sulfide is no longer evolved. A substantially inert diluent, such as a mineral lubricating oil fraction may be used in the reaction with $P_2S_5$; such a diluent is required, however, for mixtures of high viscosity such as that of the illustrative example shown hereinafter.

The $P_2S_5$ reaction mixture obtained above is then cooled, as to about 100° C., and water added, with stirring, in order to decompose the $AlCl_3$ complex. Water washing is continued until a water extract free of $AlCl_3$ is obtained. Any emulsions that may be formed in the water washing operation may be broken by adding small amounts of suitable polar materials, such as alcohols, typical of which are butanol and fusel oil. The reaction product, separated from the water washings, is then filtered through a suitable filter medium such as a diatomaceous earth, Hi-Flo, a chemically calcined natural, diatomaceous silica aid of the finest pore size. The filtrate so obtained is then distilled to remove any diluent used in the $P_2S_5$ reaction, and to remove any polar materials, as butanol, used in breaking emulsions formed in the water-washing treatment. It is desirable at this point to introduce steam at a temperature of about 300° F. to insure complete removal of light solvents. Steaming is ordinarily continued until an amount of water distillate equal in volume to the product is obtained. The portion not distilling in the distillation step will be the final product, a dithiophosphoric acid of an alkyl-substituted hydroxyaromatic compound.

It has also been found that further improvement in color and stability can be obtained by adding a small amount, such as about 1%, of zinc dust to the $P_2S_5$ reaction mixture during the treatment with water at a temperature of about 100° C., as described above. In this regard, it has been noted that a small amount of zinc dust may also be so utilized as a modification of the old method referred to hereinabove, and when so utilized cooperates to produce a product of improved color and stability, although such products are not as desirable in these respects as are those obtained by carrying out the P₂S₅ reaction in the presence of the Friedel-Crafts reaction mixture, nor are they as desirable as those obtained by the latter method when a small amount of zinc dust is used therein. In the old method, a wax-phenol and P₂S₅ are reacted at about 175° C. for some time, then cooled to about 90–100° C. As now discovered, improved products can be obtained by adding, at this point, a small amount of zinc dust together with a small amount of water and then stirring the resulting mixture. Water is removed thereafter by heating said mixture at about 110° C., and the water-free mixture is filtered through a suitable filter medium to obtain the final product.

Metal salts of the dithiophosphoric acid so obtained can be prepared by any one of several ways, such as those described in the aforesaid copending application, Serial No. 390,586. For example, the sodium salt may be prepared by reacting said acid with a sodium alcoholate, and then distilling off the alcohol. Other metal salts can be prepared from the sodium salt by metathesis with a suitable metal compound such as a halide. And as indicated above, when a substantially inert diluent is used in the reaction of P₂S₅ with the alkyl-substituted hydroxyaromatic compound, the diluent may be removed prior to the formation of a metal salt or may be removed after the metal salt has been formed. Also a mineral lubricating oil concentrate or blend containing a metal salt of the foregoing type may be prepared by using a mineral lubricating oil as the diluent.

With regard to the proportions of reactants used in the foregoing, it will be obvious that the amount of alkyl halide and hydroxyaromatic compound can be varied considerably depending upon the desired degree of alkyl substitution. The amount of P₂S₅ can also vary widely; however, it is preferred that this amount represent about 1 to 2 mols for every 4 mols of alkyl-substituted hydroxyaromatic compound formed in the Friedel-Crafts reaction. The reaction wherein a mol ratio of 1 to 4 is used may be represented by the following Equation I:

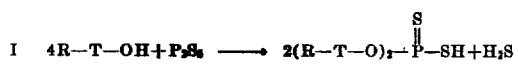

I   $4R—T—OH + P_2S_5 \longrightarrow 2(R—T—O)_2—\overset{S}{\underset{\|}{P}}—SH + H_2S$ wherein R represents an alkyl group and T represents an aromatic nucleus.

The formation of the metal salts of the dithiophosphoric acids described in Equation I may be represented by the following Equation II in which a metal hydroxide is used:

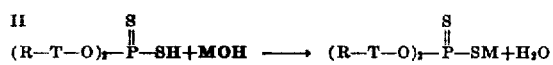

II  $(R—T—O)_2—\overset{S}{\underset{\|}{P}}—SH + MOH \longrightarrow (R—T—O)_2—\overset{S}{\underset{\|}{P}}—SM + H_2O$ wherein R and T are as defined above and M represents the hydrogen equivalent of a metal.

The reaction product obtained by using a mol ratio of 2 to 4 is more complex than that represented by the foregoing Equation I and is a mixture of a dithiophosphoric acid derivative and other constituents.

It will be apparent from the foregoing that the newly discovered method differs from that of the prior art inasmuch as the Friedel-Crafts catalyst is present during the reaction with P₂S₅, and is removed prior to the introduction of P₂S₅ in the old method. For example, in the present method, when phenol is reacted with chlorowax in the presence of aluminum chloride, a wax aluminum phenate is formed as an intermediate product which is then reacted with P₂S₅ to form the aluminum salt of the dithiophosphoric acid of a wax phenol; the aluminum salt is then washed with water to decompose the salt and liberate the free dithiophosphoric acid. On the other hand, when the same reactants and catalyst were used in prior practice, wax aluminum phenate was formed; it was then washed with water to decompose the salt and liberate a free wax phenol; the wax phenol was separated from the Friedel-Crafts catalyst, which is at this stage generally in the form of a complex, and finally reacted with P₂S₅ to form the dithiophosphoric acid of a wax phenol.

Examples of the hydroxyaromatic compounds which may be used as starting material for the Friedel-Crafts reaction with an alkyl halide, such as chlorowax are: phenol, resorcinol, hydroquinone, catechol, cresol, xylenol, hydroxydiphenyl, benzylphenol, phenyl-ethyl-phenol, phenol resins, methyl-hydroxy-diphenyl, guiacol, alpha- and beta-naphthol, alpha- and beta-methyl naphthol, tolyl naphthol, xylyl naphthol, benzyl naphthol, anthranol, phenyl methyl naphthol, phenanthrol, monomethyl ether of catechol, anisole beta naphthyl methyl ether, chlorphenol, and the like. Preference in general is to the monohydroxy phenols otherwise unsubstituted, particular preference being given to phenol and alpha- and beta-naphthol.

In general, all alkyl halides such as the chlorides of the relatively low molecular weight paraffins typified by methyl, ethyl, propyl chlorides, etc., and the heavy alkyl chlorides can be used in the method contemplated herein. The halides, and particularly the chlorides, of the relatively high molecular weight paraffins are desirable for use in preparing dithiophosphoric acids, and their corresponding metal salts, which are characterized by substantial miscibility or solubility in hydrocarbon fractions, such as mineral lubricating oils. Representative of the relatively high molecular weight halides, and preferred for use herein, are those known in the art as wax halides obtained by the halogenation of wax. For example, petroleum wax which is a paraffinic hydrocarbon obtained from petroleum and has at least eighteen carbon atoms in the molecule, can be chlorinated to various degrees to obtain several chlorine-substituted waxes, such as monochlorowax, dichlorowax, etc. Particular preference is given to chlorowaxes obtained by chlorination of a petroleum wax having a melting point not substantially less than 120° F., a molecular weight of about 250 and about 20 carbon atoms to the molecule. It will be understood from this description that the term "chlorowax" when used herein will refer to a material containing one or more chlorine atoms and a relatively high molecular weight alkyl group or radical obtained from a hydrocarbon fraction identified as wax.

For example, wax-substituted phenol prepared according to the above procedure, in which a quantity of chlorowax containing three atomic proportions of chlorine is reacted with one mol of phenol and in which the chlorowax contains twenty per cent chlorine, will for brevity herein be designated "wax-phenol (3–20)." Parenthetical expressions of the type (A–B) may be used hereinafter in connection with the alkylhydroxyaromatic compounds to designate: (A) the number of atomic proportions of chlorine in the chloraliphatic material reacted with one mol of hydroxyaromatic compound in the Friedel-Crafts reaction and (B) the chlorine content of the chloraliphatic material. In the above example, $A=3$ and $B=20$. This same designation will also apply to the dithiophosphoric acids, and their metal salts, of these alkylated compounds.

Although any of the catalysts of the group known as Friedel-Crafts catalysts can be used in the present method, it is preferred that aluminum chloride be used.

The metals contemplated herein may be broadly classified as metals of groups I to VIII, inclusive, of the periodic system, which are capable of forming salts of the aforesaid dithiophosphoric acids. These metals comprise the following: the alkali metals: lithium, sodium, potassium, rubidium and caesium; the alkaline earth metals: beryllium, magnesium, calcium, strontium and barium; the metals zinc, cadmium, mercury, scandium; the metals aluminum, gallium, indium, thallium, titanium, zirconium, cerium, thorium; germanium, tin, and lead; vanadium, columbium and tantalum; arsenic, antimony an bismuth; chromium, molybednum, tungsten and uranium; rhenium, manganese, iron, cobalt and nickel; ruthenium, rhodium and palladium; osmium, iridium and platinum.

Some of the rare earth metals are given in the foregoing. Other rare earth metals suitable for the formation of the dithiophosphoric acid salts are those now commercially available as the cerium and yttrium group: namely, a mixture of praseodymium, neodymium, samarium, europium, gadolinium, terbium, dysprosium, holmium, erbium, thallium and lutecium.

Further details in the new method of preparation contemplated herein will be apparent from the following illustrative example.

Example 1

*Preparation of Dithiophosphoric acid of wax phenol (3-14)*

Petroleum wax of A. S. T. M. melting point of 126° F. (about 52° C.) was chlorinated by introducing chlorine at about 100° C. until 14 per cent by weight of chlorine was adsorbed. One hundred grams of the chlorowax so obtained were mixed with 12.3 grams of phenol, and 3 grams of $AlCl_3$ were added at about 65° C. at a rate slow enough to avoid excessive foaming caused by the evolution of hydrogen chloride. The reaction temperature was then raised to 175° C. and the mixture was stirred for about one hour at this temperature to complete the reaction. The product at this stage was the aluminum phenate of wax phenol (3-14).

A solvent refined mineral oil (207 grams) of Saybolt Universal viscosity of 45 seconds at 210° F. was then added, followed by 7.4 grams of $P_2S_5$. The resulting mixture was then heated for four hours longer at 175° C. The reaction with $P_2S_5$ was largely completed after one hour at this temperature as indicated by the decrease in the amount of $H_2S$ evolved; however, the reaction mixture was heated longer to insure completion of the reaction. The reaction mixture was then cooled to about 100° C. and water was carefully added with stirring to decompose the aluminum chloride complex. The color of the reaction mixture was lightened at this point by the addition of 5 grams of zinc dust. Several washings with water were required to obtain a water extract free of aluminum chloride. Small amounts of butanol were added to break emulsions formed on the addition of water. The product was filtered through Hi-Flo, and the butanol distilled from the filtrate by using reduced pressure, followed by steaming at about 150° C. until an amount of water distillate equal to the volume of the product was obtained. The product obtained was a 1:3 blend in mineral oil, which contained 0.6 per cent phosphorus and 1.0 per cent sulfur, and had a neutralization number (N. N.) of 6.3. These values approximate the theoretical values for the dithiophosphoric acid of wax-phenol (3-14).

In view of the foregoing discussion, it will be clear to those familiar with the art that a dithiophosphoric acid of the foregoing type will be obtained free from oil when a diluent is not used in the preparation, or when a lower boiling diluent such as kerosene, which can be removed thereafter by distillation, is used. It will be apparent, then, that the present method provides a particularly desirable means for preparing dithiophosphoric acids (and their metal salts) of alkyl-substituted hydroxyaromatic compounds per se and in the form of mineral oil concentrates.

That the compounds obtained by the present method are more stable to heat than the corresponding compounds obtained by previous methods is clearly shown by their behavior under normal storage conditions. Those compounds obtained by previous methods continue to evolve hydrogen sulfide slowly under such conditions, which is indicative of their relative instability. On the other hand, the corresponding compounds obtained by the present method are not so characterized, for they can be heated to about 190-200° C. before hydrogen sulfide is first evolved.

The compounds obtained in this method are valuable as multifunctional mineral oil addition agents inasmuch as they effect substantial improvement of such properties as pour point, viscosity index, oxidation characteristics, etc. when used in small amounts in mineral oils. They are particularly desirable for use in oils as they impart less color to the oils in which they are incorporated, than do the corresponding compounds prepared by previous methods, discussed above. Also, they are desirable in this regard for they are less odorous and more stable to heat than said corresponding compounds. For example, a one per cent blend of a barium salt of a reaction product of wax-phenol and $P_2S_5$, obtained by the method contemplated herein, in a mineral oil fraction had a Tag Robinson color of 11; whereas, a similar one per cent blend, the corresponding barium salt prepared by the old method described hereinabove had a Tag Robinson color of only 2½. The color values of the corresponding free acid derivatives of these barium salts were approximately the same as the values for said salts.

Similarly, the compounds obtained by the improved method wherein a small amount of zinc dust is used without carrying out the $P_2S_5$ reaction in the presence of the Friedel-Crafts complex, are superior to those obtained by the old method referred to hereinabove. As an illustration, a one per cent blend of the barium salt of a reaction product of wax-phenol and $P_2S_5$, obtained by the old method modified by the use of said zinc dust, in a mineral oil fraction had a Tag Robinson color of 5 as against a color of 2½ for the corresponding blend of the related compound obtained by the old method.

We claim:

1. The method of making a dithiophosphoric acid of an alkyl-substituted phenol which comprises: reacting an alkyl halide with a phenol in the presence of a Friedel-Crafts catalyst to alkylate said phenol; then reacting the reaction mixture, formed in the first operation, with $P_2S_5$ to form a dithiophosphoric acid of an alkyl-substituted phenol; and separating said dithiophosphoric acid from the reaction mixture formed in the last-mentioned operation.

2. The method of making a dithiophosphoric acid of an alkyl-substituted phenol which comprises: reacting an alkyl halide with a phenol in the presence of a Friedel-Crafts catalyst to alkylate said phenol; then reacting the reaction mixture, formed in the first operation, with $P_2S_5$ to form a dithiophosphoric acid of an alkyl-substituted phenol, the molal quantity of $P_2S_5$ so reacted being about one-fourth as much as the alkyl-substituted phenol in said reaction mixture; treating the $P_2S_5$ reaction mixture thus obtained with a small amount of zinc dust and washing the reaction mixture so formed with water to destroy the Friedel-Crafts complex formed in the preceding operations, and separating said dithiophosphoric acid therefrom.

3. The method of making a dithiophosphoric acid of a paraffin wax-phenol which comprises: reacting a chlorinated paraffin wax and phenol in the presence of a catalytic amount of $AlCl_3$ at a temperature not greater than about 175° C. to alkylate phenol with paraffin wax; then reacting the reaction mixture, formed in the first operation, with $P_2S_5$ in the presence of a substantially-inert hydrocarbon diluent to form a dithiophosphoric acid of a paraffin wax-phenol, the molal quantity of $P_2S_5$ so reacted being about one-fourth as much as the paraffin wax-phenol in said reaction mixture; washing the reaction mixture, formed in the preceding operation, with water to destroy the Friedel-Crafts complex formed in the preceding operations, and separating said dithiophosphoric acid therefrom.

4. The method of making a dithiophosphoric acid of a paraffin wax-phenol which comprises: reacting a chlorinated paraffin wax and phenol in the presence of a catalytic amount of $AlCl_3$ at a temperature not greater than about 175° C. to alkylate phenol with paraffin wax; then reacting the reaction mixture, formed in the first operation, with $P_2S_5$ in the presence of a substantially-inert hydrocarbon diluent to form a dithiophosphoric acid of a paraffin wax-phenol, the molal quantity of $P_2S_5$ so reacted being about one-fourth as much as the paraffin wax-phenol in said reaction mixture; treating the $P_2S_5$ reaction mixture thus obtained with a small amount of zinc dust at about 100° C. and washing the reaction mixture so formed with water to destroy the Friedel-Crafts complex formed in the preceding operations, and separating said dithiophosphoric acid therefrom.

5. The method of making a metal salt of a dithiophosphoric acid of an alkyl-substituted phenol which comprises reacting an alkyl halide with a phenol in the presence of a Friedal-Crafts catalyst to alkylate said phenol; then reacting the reaction mixture, formed in the first operation, with $P_2S_5$ in the presence of a substantially-inert hydrocarbon diluent to form a dithiophosphoric acid of an alkyl-substituted phenol, the molal quantity of $P_2S_5$ so reacted being about one-fourth as much as the alkyl substituted phenol in said reaction mixture; washing the reaction mixture, formed in the preceding operation, with water to destroy the Friedel-Crafts complex formed in the preceding operations, and separating said dithiophosphoric acid therefrom; and substituting said dithiophosphoric acid with metal.

6. The method of making a metal salt of a dithiophosphoric acid of a paraffin wax-substituted phenol which comprises: reacting a chlorinated paraffin wax with a phenol in the presence of a Friedel-Crafts catalyst to alkylate said phenol with paraffin wax; then reacting the reaction mixture, formed in the first operation, with $P_2S_5$ in the presence of a substantially-inert hydrocarbon diluent to form a dithiophosphoric acid of a paraffin wax-substituted phenol, the molal quantity of $P_2S_5$ so reacted being about one-fourth as much as the paraffin wax-substituted phenol in said reaction mixture; washing the reaction mixture, formed in the preceding operation, with water to destroy the Friedel-Crafts complex formed in the preceding operations, and separating said dithiophosphoric acid therefrom; and substituting said dithiophosphoric acid with metal.

7. The method of making a mineral oil concentrate containing a dithiophosphoric acid of an alkyl-substituted phenol which comprises: reacting an alkyl halide and a phenol in the presence of a Friedel-Crafts catalyst to alkylate said phenol; then reacting the reaction mixture, formed in the first operation, with $P_2S_5$ in the presence of a substantially-inert mineral oil to form a mineral oil concentrate containing a dithiophosphoric acid of an alkyl-substituted phenol, the amount of $P_2S_5$ so reacted being about one-fourth as much as the alkyl-substituted phenol in said reaction mixture; washing the reaction mixture, formed in the preceding operation, with water to destroy the Friedel-Crafts complex formed in the preceding operations; and separating said mineral oil concentrate from the reaction mixture formed in the preceding operation.

8. The method of making a mineral oil concentrate containing a dithiophosphoric acid of a paraffin wax-substituted phenol, which comprises: reacting a chlorinated paraffin wax and a phenol in the presence of a Friedel-Crafts catalyst to alkylate said phenol with paraffin wax; then reacting the reaction mixture, formed in the first operation, with $P_2S_5$ in the presence of a substantially-inert mineral oil to form a mineral oil concentrate containing a dithiophosphoric acid of a paraffin wax-substituted phenol, the amount of $P_2S_5$ so reacted being about one-fourth as much as the paraffin wax-substituted phenol in said reaction mixture; washing the reaction mixture, formed in the preceding operation, with water to destroy the Friedel-Crafts complex formed in the preceding operations; and separating said mineral oil concentrate from the reaction mixture formed in the preceding operation.

9. The method of making a mineral oil concentrate containing a metal salt of a dithiophosphoric acid of an alkyl-substituted phenol, which comprises: reacting an alkyl halide and a phenol in the presence of a Friedel-Crafts catalyst to alkylate said phenol; reacting the reaction mixture, formed in the first operation, with $P_2S_5$ in the presence of a substantially-inert mineral oil to form a mineral oil concentrate containing a dithiophosphoric acid of an alkyl-substituted phenol, the amount of P₂S₅ so reacted being about one-fourth as much as the alkyl-substituted phenol in said reaction mixture; washing the reaction mixture, formed in the preceding operation, with water to destroy the Friedel-Crafts complex formed in the preceding operations, and separating said mineral oil concentrate containing said dithiophosphoric acid therefrom; and substituting said dithiophosphoric acid with metal to form a mineral oil concentrate containing a metal salt of said dithiophosphoric acid.

10. The method of making a mineral oil concentrate containing a metal salt of a dithiophosphoric acid of a paraffin wax-substituted phenol, which comprises: reacting a chlorinated paraffin wax and a phenol in the presence of a Friedel-Crafts catalyst to alkylate said phenol with paraffin wax; reacting the reaction mixture, formed in the first operation, with P₂S₅ in the presence of a substantially-inert mineral oil to form a mineral oil concentrate containing a dithiophosphoric acid of a paraffin wax-substituted phenol, the amount of P₂S₅ so reacted being about one-fourth as much as the paraffin wax-substituted phenol in said reaction mixture; washing the reaction mixture formed in the preceding operation with water to destroy the Friedel-Crafts complex formed in the preceding operations, and separating said mineral oil concentrate containing said dithiophosphoric acid therefrom; and substituting said dithiophosphoric acid with metal to form a mineral oil concentrate containing a metal salt of said dithiophosphoric acid.

11. An improved mineral oil composition comprising a viscous mineral oil fraction having in admixture therewith a minor proportion of a dithiophosphoric acid of an alkyl-substituted phenol obtained by: reacting an alkyl halide with a phenol in the presence of a Friedel-Crafts catalyst to alkylate said phenol; then reacting the reaction mixture, formed in the first operation, with P₂S₅ to form a dithiophosphoric acid of an alkyl-substituted phenol, the molal quantity of P₂S₅ so reacted being about one-fourth as much as the alkyl-substituted phenol in said reaction mixture; washing the reaction mixture, formed in the preceding operation, with water to destroy the Friedel-Crafts complex formed in the preceding operations; and separating said dithiophosphoric acid from the reaction mixture formed in the last-mentioned operation.

12. An improved mineral oil composition comprising a viscous mineral oil fraction having in admixture therewith a minor proportion of a metal salt of a dithiophosphoric acid of an alkyl-substituted phenol obtained by: reacting an alkyl halide with a phenol in the presence of a Friedel-Crafts catalyst to alkylate said phenol; then reacting the reaction mixture, formed in the first operation, with P₂S₅ to form a dithiophosphoric acid of an alkyl-substituted phenol, the molal quantity of P₂S₅ so reacted being about one-fourth as much as the alkyl-substituted phenol in said reaction mixture; washing the reaction mixture, formed in the preceding operation, with water to destroy the Friedel-Crafts complex formed in the preceding operations; separating said dithiophosphoric acid from the reaction mixture formed in the last-mentioned operation; and substituting said dithiophosphoric acid with metal.

ORLAND M. REIFF.
HARRY J. ANDRESS, JR.

CERTIFICATE OF CORRECTION.

Patent No. 2,386,207. October 9, 1945.

ORLAND M. REIFF, ET AL.

It is hereby certified that error appears in the printed specification of the above numbered patent requiring correction as follows: Page 1, second column, line 37, before "aid" insert the word --filter--; and that the said Letters Patent should be read with this correction therein that the same may conform to the record of the case in the Patent Office.

Signed and sealed this 9th day of April, A. D. 1946.

Leslie Frazer (Seal) First Assistant Commissioner of Patents.

a dithiophosphoric acid of an alkyl-substituted phenol, the amount of P₂S₅ so reacted being about one-fourth as much as the alkyl-substituted phenol in said reaction mixture; washing the reaction mixture, formed in the preceding operation, with water to destroy the Friedel-Crafts complex formed in the preceding operations, and separating said mineral oil concentrate containing said dithiophosphoric acid therefrom; and substituting said dithiophosphoric acid with metal to form a mineral oil concentrate containing a metal salt of said dithiophosphoric acid.

10. The method of making a mineral oil concentrate containing a metal salt of a dithiophosphoric acid of a paraffin wax-substituted phenol, which comprises: reacting a chlorinated paraffin wax and a phenol in the presence of a Friedel-Crafts catalyst to alkylate said phenol with paraffin wax; reacting the reaction mixture, formed in the first operation, with P₂S₅ in the presence of a substantially-inert mineral oil to form a mineral oil concentrate containing a dithiophosphoric acid of a paraffin wax-substituted phenol, the amount of P₂S₅ so reacted being about one-fourth as much as the paraffin wax-substituted phenol in said reaction mixture; washing the reaction mixture formed in the preceding operation with water to destroy the Friedel-Crafts complex formed in the preceding operations, and separating said mineral oil concentrate containing said dithiophosphoric acid therefrom; and substituting said dithiophosphoric acid with metal to form a mineral oil concentrate containing a metal salt of said dithiophosphoric acid.

11. An improved mineral oil composition comprising a viscous mineral oil fraction having in admixture therewith a minor proportion of a dithiophosphoric acid of an alkyl-substituted phenol obtained by: reacting an alkyl halide with a phenol in the presence of a Friedel-Crafts catalyst to alkylate said phenol; then reacting the reaction mixture, formed in the first operation, with P₂S₅ to form a dithiophosphoric acid of an alkyl-substituted phenol, the molal quantity of P₂S₅ so reacted being about one-fourth as much as the alkyl-substituted phenol in said reaction mixture; washing the reaction mixture, formed in the preceding operation, with water to destroy the Friedel-Crafts complex formed in the preceding operations; and separating said dithiophosphoric acid from the reaction mixture formed in the last-mentioned operation.

12. An improved mineral oil composition comprising a viscous mineral oil fraction having in admixture therewith a minor proportion of a metal salt of a dithiophosphoric acid of an alkyl-substituted phenol obtained by: reacting an alkyl halide with a phenol in the presence of a Friedel-Crafts catalyst to alkylate said phenol; then reacting the reaction mixture, formed in the first operation, with P₂S₅ to form a dithiophosphoric acid of an alkyl-substituted phenol, the molal quantity of P₂S₅ so reacted being about one-fourth as much as the alkyl-substituted phenol in said reaction mixture; washing the reaction mixture, formed in the preceding operation, with water to destroy the Friedel-Crafts complex formed in the preceding operations; separating said dithiophosphoric acid from the reaction mixture formed in the last-mentioned operation; and substituting said dithiophosphoric acid with metal.

ORLAND M. REIFF.
HARRY J. ANDRESS, Jr.

CERTIFICATE OF CORRECTION.

Patent No. 2,386,207. October 9, 1945.

ORLAND M. REIFF, ET AL.

It is hereby certified that error appears in the printed specification of the above numbered patent requiring correction as follows: Page 1, second column, line 37, before "aid" insert the word --filter--; and that the said Letters Patent should be read with this correction therein that the same may conform to the record of the case in the Patent Office.

Signed and sealed this 9th day of April, A. D. 1946.

Leslie Frazer (Seal) First Assistant Commissioner of Patents.